United States Patent [19]

Kell

[11] 3,765,519

[45] Oct. 16, 1973

[54] PISTON AND RETRACTION SPRING SUBASSEMBLY

[75] Inventor: Nathaniel B. Kell, Indianapolis, Ind.

[73] Assignee: General Motors Corporation, Detroit, Mich.

[22] Filed: Jan. 13, 1972

[21] Appl. No.: 217,478

[52] U.S. Cl............ 188/366, 188/72.4, 192/85 AA
[51] Int. Cl............................................ F16d 65/32
[58] Field of Search................... 188/216, 72.3, 366, 188/72.4; 192/70.28, 101, 85 AA; 92/165; 287/20.3, DIG. 7

[56] References Cited
UNITED STATES PATENTS

| | | | |
|---|---|---|---|
| 3,596,537 | 8/1971 | Koivunen | 192/85 AA X |
| 2,509,081 | 5/1950 | Bluth et al. | 287/DIG. 7 |
| 3,394,631 | 7/1968 | Thompson | 92/165 R X |

*Primary Examiner*—George E. A. Halvosa
*Attorney*—Warren E. Finken et al.

[57] ABSTRACT

The transmission illustrated includes a central support or web member having annular chambers formed in both end faces thereof, with an annular piston mounted in each chamber and a spring retainer plate mounted adjacent the outer edge of each chamber. Once assembled, the spring retainer plate is self-locking in that a conically shaped outer surface formed on a plurality of tabs located around the outer periphery of each of the spring retainers is urged into contact with respective oppositely disposed conical recesses formed just inside the web end faces by a spring which also urges the piston away from the retainer plate and into the chamber. The retainer plate is mounted in place by first inserting one or more of its ear portions within the conical recess and then bowing the retainer plate to insert the remaining ear portions therein. A cylindrical extension formed on the annular piston extends through the central opening of the retainer plate to selectively engage the adjacent clutch or brake plates.

4 Claims, 3 Drawing Figures

PATENTED OCT 16 1973　3,765,519

PISTON AND RETRACTION SPRING SUBASSEMBLY

This invention relates generally to transmissions and, more particularly, to an improved piston and retraction spring subassembly therefor.

Transmission constructions which require assembly of many complex parts on different splines, the use of many snap rings and the compression of the retraction springs for the pistons of the fluid actuators during assembly of the transmission parts in the housing generally present a difficult and expensive assembly operation.

Accordingly, an object of the invention is to provide an improved fluid actuator assembly which includes a self-locking piston housing and spring retainer plate arrangement which is readily preassembled for mounting in a transmission.

A further object of the invention is to provide a fluid actuator preassembly wherein the outer peripheral edges of mounting ears or tabs formed on a thin spring retainer plate are conically shaped to match a reverse conical shape formed on the inner surface adjacent the edge of a piston housing, with the thin spring retainer plate having to be temporarily deformed against the force of the springs while being inserted into the conical portion of the piston housing past the smallest diameter thereof, the springs confined therein serving to maintain the two conical surfaces in contact with one another while urging the piston into clutch-disengaging position.

These and other objects and advantages of the invention will be apparent when reference is made to the following description and accompanying drawings, wherein.

Figure 1:
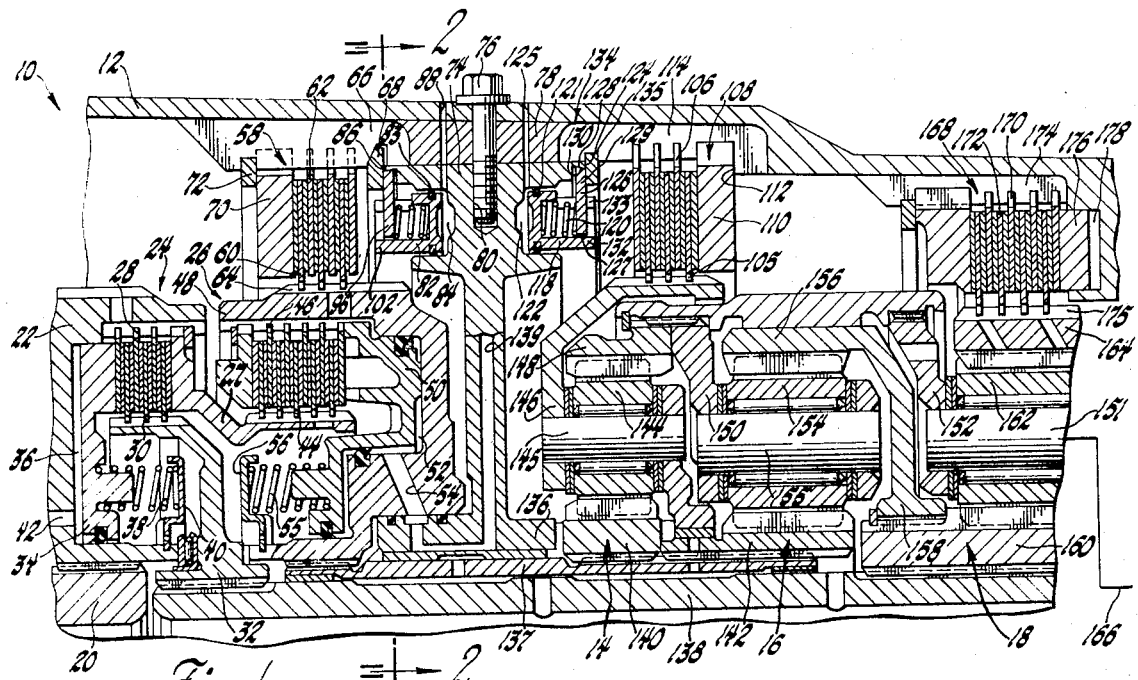
FIG. 1 is a fragmentary cross-sectional view of the transmission gearing and fluid-actuated clutch arrangements embodying the invention.

Referring now to the drawings in greater detail, FIG. 1 illustrates a transmission 10 including a housing 12 cooperable with a torque converter and hydraulic pump, not shown but fully described in U.S. application Ser. No. 805,190, "Power Transmission," filed Mar. 7, 1969 in the name of John J. O'Malley, and including three planetary gearsets 14, 16, and 18. A related transmission is also fully described in U.S. Pat. No. 3,596,537 Koivunen, which issued on Aug. 3, 1971.

A torque converter of conventional construction transmits power from the engine (not shown) to the transmission gearing through an input shaft 20 splined to a clutch housing 22. The clutch housing 22 is drivingly connected to two input clutches 24 and 26. A hub 27 is splined to an inner surface of the housing 22.

The first input clutch 24 includes a plurality of alternately spaced clutch plates 28 and 30 splined to the clutch housing 22 and to a hub member 32, respectively. A piston 34 is slidably mounted in a fluid chamber 36 formed in the clutch housing 22. The fluid pressure in the chamber 36 urges the piston 34 to engage the clutch plates 28 and 30 of the input clutch 24. A return spring 38 is held in compression between the piston 34 and a spring retainer 40 mounted on the clutch housing 22. The return spring 38 urges the piston 34 away from the clutch plates 28 and 30 when the fluid chamber 36 is not pressurized. A passage 42, formed in the clutch housing 22, is adapted to supply fluid under pressure to the chamber 36.

The second input clutch 26 includes a plurality of alternately spaced clutch plates 44 and 46 splined respectively to the hub 27 and to a drum 48. A piston 50 is slidably mounted in a fluid chamber 52 formed in the drum 48. A passage 54, formed in the drum 48, conveys fluid under pressure to the chamber 52 to selectively engage the clutch 26. A return spring 55 is compressed between the piston 50 and a spring retainer 56 mounted on an end portion of the drum 48 and functions to move the piston 50 away from the clutch plates 44 and 46 when the chamber 52 is not pressurized.

A first brake 58 is also operatively connected to the drum 48 and includes spaced plates 60, which are slidably mounted on splines 64 formed on the drum 48, and alternately spaced plates 62 slidably mounted on splines 66 formed on an inner surface of the transmission housing 12 intermediate a snap ring 68 and a backing plate 70 adjacent a second snap ring 72.

A central support or web member 74 is secured in the transmission housing 12 by fasteners, such as the fastener 76 extending through the wall of the housing 12 and thence through an internal boss 78 into an opening 80 formed in the web member 74. An annular piston or movable actuator member 82 including suitable seals 83, is slidably mounted in an annular chamber or cylinder 84 formed in an end face 86 of the central web member 74. A passage 88 is formed through a wall of the housing 12 and the boss 78 and in the web member 74 to communicate fluid under pressure from a suitable source to the annular chamber 84 to move the piston 82 to selectively engage the plates 60 and 62 of the brake 58.

Figure 2:
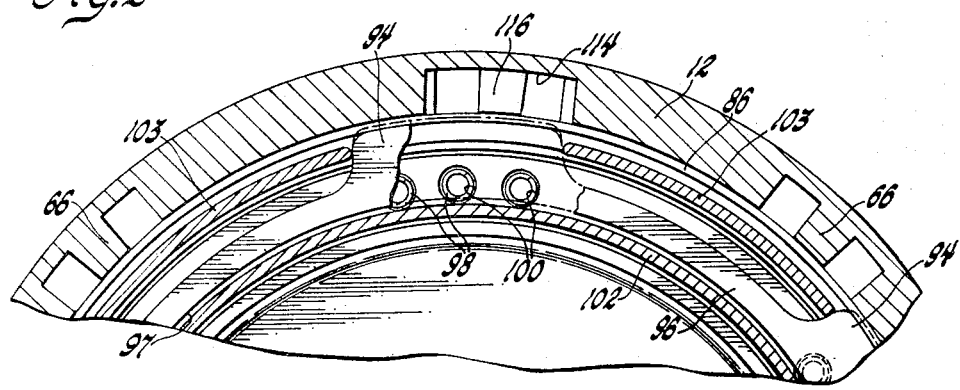
FIG. 2 is a fragmentary cross-sectional view taken along the plane of line 2—2 of FIG. 1 and looking in the direction of the arrows.
Figure 3:
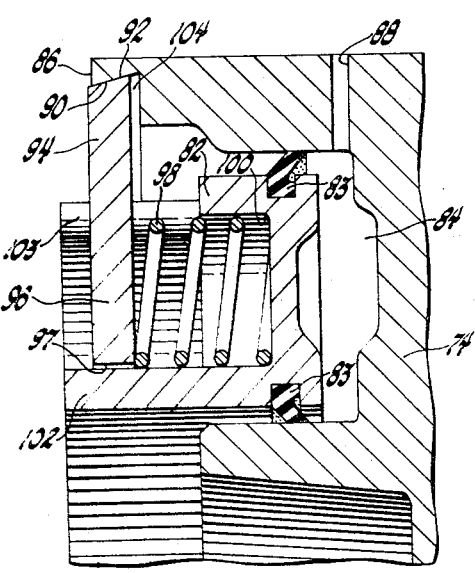
FIG. 3 is an enlarged view of a portion of FIG. 1.

Referring now to FIG. 3, it may be noted that a conical surface 90 of approximately 15° to 20° is formed adjacent the end face 86 of the central web member 74 and exteriorly of the piston chamber 84. A mating conical surface 92 is formed on the outer periphery of anchoring ear portions or arcuate tabs 94 (FIG. 2) formed on a spring retainer ring or plate 96 having a central opening 97. A plurality of clutch springs 98 each abut at one end thereof against the bottom of respective spaced pockets 100 formed in the piston 82 and at the other end thereof against the spring retainer plate 96, thus urging the piston 82 to the right (FIGS. 1 and 3) into the chamber 84, and simultaneously urging the retainer plate 96 leftwardly into locking contact with the conical mating surface 90. A cylindrical extension 102 is formed on the annular piston 82 adjacent the inner periphery thereof so as to extend beyond the spring retainer plate 96 through the central opening 97 thereof. A plurality of arcuate segments 103 (FIGS. 2 and 3) are formed on the end of the piston 82 so as to extend through the arcuate openings intermediate the ear portions 94, terminating on the same plane as the end of the cylindrical extension 102 for abutting evenly against the adjacent brake plate 62.

Assembly of the retainer plate 96 in the web member 74 is accomplished by first inserting one or more of the ear portions 94 into the conical recess 90, and then bowing the relatively thin plate 96 to progressively insert the remaining ear portions 94. A clearance 104 (FIG. 3) in the web member 74 facilitates the bowing and inserting process.

A plurality of plates 105 and 106 of a second brake 108 abut at one end thereof against a fixed abutment plate 110 which is axially positioned by a shoulder 112 formed in the housing 12, with the plates 106 mounted in recesses 114 of splines 116 (FIG. 2). An oppositely disposed annular piston 118, similar to the piston 82, with cooperating springs 120 being comparable to the clutch springs 98, includes suitable seals 121 and is slidably mounted in an annular chamber 122 formed in the opposite face 124 of the web member 74. A passage 125 comparable to the passage 88 is formed through a wall of the housing 12, the boss 78 and in the web member 74 to communicate fluid under pressure from a suitable source to the annular chamber 122.

A spring retainer plate or ring 126, comparable to the spring retainer ring 96, includes a central opening 127 and an outer conical surface 128 formed on ear portions 129, the latter being comparable to the ear portions 94 (FIG. 2). The conical surface 128 matches a conical surface 130 formed in the piston chamber 122 adjacent the face 124. A cylindrical extension 132, like the extension 102, is formed on the piston 118 and extends through the opening 127 in the spring retainer plate 126 to a position adjacent the plates 105 and 106. Likewise, arcuate segments 133, comparable to the segments 103, are formed on the piston 118 to extend intermediate the ear portions 129 to cooperate with the cylindrical extension 132 to selectively cause the engagement of the plates 105 and 106. Assembly of the retainer plate 126 is accomplished in the same manner as that described relative to the retainer plate 96.

Once the web and piston assembly 134 is thus completed, it is inserted into the transmission housing 12 to be secured therein by the fastener 76. As illustrated in FIG. 3, the outer face of the retainer plate 96, as well as the outer face of the retainer plate 126, each extend past the respective faces 86 and 124 of the web member 74 after being preassembled and, thus, both retainer plates 96 and 126 are urged inwardly against the forces of the respective springs 98 and 120 by the snap rings 68 and 135 (FIG. 1) after final assembly of the assembly 134 in the housing 12, relieving the engagement between the conical surfaces 90 and 92 somewhat and supporting the retainer rings 96 and 126 completely around their outer faces.

A hub 136 of the web member 74 provides rotational support for a first intermediate sleeve shaft 137 which is splined to the drum 48 and for a second intermediate sleeve shaft 138 which is splined to the hub 32 and rotatably journaled in the first intermediate sleeve shaft 137. A passage 139 is formed through the web member 74 to communicate fluid under pressure from a suitable source to the passage 54 for communication with the clutch chamber 52.

The sleeve shaft 137 is splined to a pair of sun gears 140 and 142 which are components of the planetary gearsets 14 and 16, respectively. The planetary gearset 14 also includes a plurality of planet pinion gears 144 which are rotatably mounted by planet shafts 145 on a carrier 146 and mesh with the sun gear 140 and a ring gear 148, the latter being drivingly connected to a carrier 150 of the planetary gearset 16 and to a carrier 152 which is a member of the planetary gearset 18. The carrier 146 is operatively connected to the brake 108 by virtue of the plurality of alternately spaced rear brake plates 105 and 106 thereof being splined to the carrier 146 and the transmission housing 12, respectively.

The planetary gearset 16 includes a plurality of planet pinion gears 154 which are rotatably mounted by planet shafts 155 on the carrier 150 and mesh with the sun gear 142 and a ring gear 156 which is drivingly connected through a hub 158 with a sun gear 160 of the planetary gearset 18. The ring gear 156 of the gearset 16 and the sun gear 160 of the gearset 18 are both splined to the intermediate sleeve shaft 138 which is connected to the input clutch 24.

The planetary gearset 18 also includes a plurality of planet pinion gears 162 which are rotatably mounted by planet shafts 151 on the carrier 152 and mesh with the sun gear 160 and a ring gear 164. The carrier 152 of the gearset 18, and the carrier 150 of the gearset 16 and the ring gear 148 of the gearset 14 are drivingly connected to a transmission output shaft represented by 166. The ring gear 164 is operatively connected to a brake 168 which includes a plurality of alternately spaced brake plates 170 and 172 splined respectively to splines 174 formed in the transmission housing 12 and splines 175 formed on the ring gear 164.

A piston 176 is slidably disposed in a chamber 178 formed in the transmission housing 12. When the chamber 178 is filled with fluid under pressure, the piston 176 engages the brake plates 170 and 172, thereby applying the brake 168. A plurality of return springs (not shown) are provided to move the piston 176 out of engagement with the brake plates 170/172 when the chamber 178 is not pressurized.

The clutches and brakes described above are actuated by fluid pressure in the manner described in the above-mentioned application Ser. No. 805,190. It should be noted that the respective brake plates 62/64 and 105/106 of the brakes 58 and 108 are engaged upon being contacted by the respective piston extensions 102 and 132 when the respective pistons 82 and 118 are actuated by the fluid pressure. Cooperation of the brakes 58 and 108 with the above-described clutches and brakes in the particular transmission 10 illustrated will now be described with respect to the various speed ratios available therefrom.

Engagement of the clutch 24 provides a drive connection from the torque converter to the sun gear 160 and the ring gear 156. Engagement of the clutch 26 provides a drive connection from the torque converter or input to the sun gears 140 and 142. Engagement of the brake 58 restrains the sun gears 140 and 142 from rotation to thereby establish sun gear 142 as a reaction member. The brake 108 restrains the carrier 146 from rotation and thereby establishes the carrier 146 as a reaction member. The brake 168 restrains the ring gear 164 from rotation and thereby establishes the ring gear 164 as a reaction member.

To provide first gear drive forward, the clutch 24 and the brake 168 are engaged, thus providing a simple planetary reduction in the planetary gearset 18.

To establish a second gear forward, the brake 168 is disengaged while the brake 108 is engaged and the clutch 24 remains engaged to provide a compound reduction drive in planetary gearsets 16 and 14 between the input shaft 20 and the output shaft 166. In second gear forward, the ring gear 156 is the input member for the planetary gearing, and the ring gear 148 and the carrier 150 are the output members. The planetary gearset 18 merely idles and carries no load.

To establish third gear forward, the brake 108 is disengaged while the brake 58 is engaged and the clutch 24 remains engaged, thus providing a simple planetary reduction in the planetary gearset 16 between the input shaft 20 and the output shaft 166. The ring gear 156 is also the input member in third gear forward, and the carrier 150 is the output member.

To establish fourth gear forward, the brake 58 is disengaged while the clutch 26 is engaged and the clutch 24 remains engaged. With both clutches 24 and 26 engaged, the planetary gearsets 14, 16, and 18 are in a locked-up or one-to-one condition, thus providing a direct drive from the input shaft 20 to the output shaft 166.

To establish one reverse ratio, the clutch 26 is engaged and the brake 168 is engaged. This provides a compound reverse reduction ratio in the planetary gearsets 16 and 18 between the input shaft 20 and the output shaft 166. In this reverse drive, the sun gear 142 of the gearset 16 is the input member, and the carrier 152 of the gearset 18 is the output member for the planetary gearsets 16 and 18.

To establish another reverse ratio, the brake 168 is disengaged while the brake 108 is engaged and the clutch 26 remains engaged. This establishes a simple planetary reverse reduction drive in the planetary gearset 14 between the input shaft 20 and the output shaft 166. In this drive, the sun gear 140 is the input member, and the ring gear 148 is the output member of the planetary gearset 14.

It should be apparent that the invention provides an improved and simplified fluid actuator mechanism including a self-interlocking piston housing and spring retainer plate arrangement which can be readily and securely preassembled without recourse to additional retainer components, so as to insure continued efficient operation after final assembly in the transmission.

While but one embodiment of the invention has been shown and described, other modifications thereof are possible.

I claim:

1. For use in a transmission housing including a first and second brake means each operative to brake an element to establish ratio drives, a fluid actuator assembly adaptable to being preassembled and comprising a support member, an annular chamber formed adjacent each end face of said support member, a spring retainer ring mounted in each of said annular chambers, a first conical surface formed on the entire outer peripheral surface of each of a plurality of spaced ear portions formed on each of said spring retainer rings and a second conical surface formed on the entire surface of each of said annular chambers adjacent each of said respective end faces, said spring retainer ring being adaptable to being bowed for initial insertion into said annular chamber, annular piston means slidably mounted in each of said annular chambers, spring means mounted between said piston means and each of said spring retainer rings for urging said first conical surfaces of said ear portions of said spring retainer rings into engagement with said second conical surface in each of said annular chambers after being preassembled, and first and second extension means formed on each of said piston means and extending respectively past the inner periphery of each of said spring retainer rings and past the outer periphery thereof intermediate said spaced ear portions for selectively engaging each of said respective first and second brake means, and first and second snap rings mounted in said transmission housing adjacent said end faces of said support member of said fluid actuator assembly and in contact with said respective spring retainer rings for relieving the engagement of said first and second conical surfaces and providing full annular axial support for said spring retainer rings.

2. A fluid actuator device comprising a web member; an annular chamber formed in a face of said web member; movable actuator means slidably mounted in said annular chamber and having a fluid-confining face facing in one axial direction, a spring seat facing in the opposite direction and an actuator portion formed radially inwardly of said spring seat and extending therefrom in said opposite direction; a conically shaped recess formed in said annular chamber and having the smallest diameter end thereof located at the plane of said face of said web member; a spring retainer ring having a plurality of spaced arcuate tabs formed at equal circumferential intervals on the outer periphery thereof and adapted to be flexed in order to be positioned within said conically shaped recess radially outwardly of said actuator portion, each of said arcuate tabs having an oppositely disposed conically shaped surface formed on the entire outer periphery thereof matching said conically shaped recess; and a spring positioned between said spring seat and said spring retainer ring for simultaneously urging said arcuate tabs into mating engaging contact with said conically shaped recess and said movable actuator means away from said spring retainer ring and toward the bottom of said annular chamber, cooperation between said tabs and recess forming the sole retention means for said spring retainer ring in said annular chamber.

3. For use in a transmission housing including friction discs alternately engageable and disengageable to establish ratio drives, a fluid actuator assembly comprising a support member, an annular chamber formed in an end face of said support member, a spring retainer ring mounted in said annular chamber adjacent said end face, a plurality of arcuate tabs formed on the outer periphery of said spring retainer ring, a conical surface formed on the entire outer peripheral surface of each of said arcuate tabs and an oppositely disposed matching conical surface formed in said annular chamber adjacent said end face, said conical surface of said annular chamber having its smallest diameter position located at said end face, annular piston means slidably mounted in said annular chamber, spring means mounted between said piston means and said spring retainer ring for urging said conical surfaces of said arcuate tabs into engagement with said conical surface in said annular chamber, and extension means formed on said piston means extending past the inner periphery of said spring retainer ring for selectively engaging said friction discs cooperation between said tabs and conical surface forming the sole retention means for said spring retainer ring in said annular chamber.

4. The fluid actuator assembly described in claim 3, wherein said spring retainer ring is formed sufficiently thin enough to have one or more of said arcuate tabs inserted past said smallest diameter portion of said conical surface and to then permit being bowed to facilitate the insertion of the remaining arcuate tabs into said annular chamber.

* * * * *